US010467911B2

(12) United States Patent
Kneuper et al.

(10) Patent No.: US 10,467,911 B2
(45) Date of Patent: Nov. 5, 2019

(54) SYSTEM AND METHOD TO ANALYZE DATA BASED ON AIR TRAFFIC VOLUME

(71) Applicant: THE BOEING COMPANY, Chicago, IL (US)

(72) Inventors: Nils Kneuper, Bergkamen (DE); Ralf René Shu-Zhong Cabos, Braunschweig (DE)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/680,154

(22) Filed: Aug. 17, 2017

(65) Prior Publication Data

US 2019/0057611 A1    Feb. 21, 2019

(51) Int. Cl.
*G06N 5/02* (2006.01)
*G08G 5/00* (2006.01)

(52) U.S. Cl.
CPC .......... *G08G 5/0034* (2013.01); *G06N 5/022* (2013.01); *G08G 5/0091* (2013.01)

(58) Field of Classification Search
CPC ..... G08G 5/0034; G08G 5/0091; G06N 5/022
USPC ........................................................ 701/120
See application file for complete search history.

(56) References Cited

U.S. PATENT DOCUMENTS

| 6,134,500 | A | 10/2000 | Tang et al. | |
|---|---|---|---|---|
| 6,380,869 | B1 * | 4/2002 | Simon | G08G 5/0013 340/945 |
| 7,877,107 | B2 | 1/2011 | Joung | |
| 8,290,696 | B1 * | 10/2012 | Sridhar | G08G 5/045 701/1 |
| 8,935,174 | B2 | 1/2015 | Chen et al. | |
| 2016/0004969 | A1 | 1/2016 | Cetinich et al. | |
| 2016/0125741 | A1 * | 5/2016 | Shorter, Jr. | G08G 5/0034 701/528 |
| 2016/0275801 | A1 * | 9/2016 | Kopardekar | G08G 5/0043 |
| 2018/0045854 | A1 | 2/2018 | Kneuper et al. | |

OTHER PUBLICATIONS

Hausenblas, et al., "Lambda Architecture", 2017, accessed Aug. 17, 2017, 2 pages. <http://lambda-architecture.net/>.
Extended European Search Report for Application No. 17174468.3 dated Jul. 6, 2017, 5 pgs.

(Continued)

*Primary Examiner* — Rami Khatib
(74) *Attorney, Agent, or Firm* — Toler Law Group, PC

(57) ABSTRACT

A method includes accessing historical data including timestamped meteorological data and flight path data. The timestamped meteorological data indicates meteorological conditions detected in each of a plurality of geographic regions. The flight path data indicates air traffic volume in each of the plurality of geographic regions during particular time periods. The method also includes, based on the historical data, identifying at least one meteorological condition and at least one time period corresponding to higher than threshold air traffic volume in a particular geographic region of the plurality of geographic regions. The method further includes generating a filter criterion based on the particular geographic region, the at least one meteorological condition, and the at least one time period. The method also includes generating a flight plan based on a portion of the historical data that satisfies the filter criterion.

20 Claims, 4 Drawing Sheets

(56) References Cited

OTHER PUBLICATIONS

"Complexity Challenges in ATM", ComplexWorld 2016, pp. 1-45.
Cheung, Jacob, et al., "Recommendations on trajectory selection in flight planning based on weather uncertainty", SESARWPE Long Term and Innovative Research, Fifth SESAR Innovation Days Dec. 2015, 7 pgs.

* cited by examiner

Filter Criterion 105

(Location = Geographic Region 107) AND (Time Period(s) 111 = 2:00 PM – 3:00 PM) AND (Meteorological Condition(s) 109 = SE Wind Direction)

Data 303

| Time Period | Traffic | Wind Direction | Temperature | Humidity |
|---|---|---|---|---|
| June 5, 2017, Monday, 2:00 PM – 2:10 PM | 15 flights | SE | 80 degrees | 42 percent |
| June 5, 2017, Monday, 2:10 PM – 2:30 PM | 10 flights | E | 80 degrees | 39 percent |
| June 5, 2017, Monday, 2:30 PM – 3:00 PM | 5 flights | SE | 85 degrees | 42 percent |
| June 5, 2017, Monday, 3:00 PM – 4:00 PM | 15 flights | SE | 83 degrees | 55 percent |

Data Portion 313

| Time Period | Traffic | Wind Direction | Temperature | Humidity |
|---|---|---|---|---|
| June 5, 2017, Monday, 2:00 PM – 2:10 PM | 15 flights | SE | 80 degrees | 42 percent |
| June 5, 2017, Monday, 2:30 PM – 3:00 PM | 5 flights | SE | 85 degrees | 42 percent |

Data Portion 113

| Time Period | Traffic | Wind Direction | Temperature |
|---|---|---|---|
| June 5, 2017, Monday, 2:00 PM – 2:10 PM | 15 flights | SE | 80 degrees |
| June 5, 2017, Monday, 2:30 PM – 3:00 PM | 5 flights | SE | 85 degrees |

FIG. 3

SYSTEM AND METHOD TO ANALYZE DATA BASED ON AIR TRAFFIC VOLUME

FIELD OF THE DISCLOSURE

The present disclosure is generally related to analyzing data based on air traffic volume.

BACKGROUND

Increasingly large amounts of data, such as meteorological data, is being generated by various data sources. For example, commercial aircraft provide thousands of meteorological observations per day. With growing volumes of data as well as the growing number of data sources, there is a large amount of meteorological data and flight path data available for analysis. Use of the data to train predictive aviation models is limited by the availability of time, processing resources, and data storage resources.

SUMMARY

In a particular implementation, method includes accessing historical data including timestamped meteorological data and flight path data. The timestamped meteorological data indicates meteorological conditions detected in each of a plurality of geographic regions. The flight path data indicates air traffic volume in each of the plurality of geographic regions during particular time periods. The method also includes, based on the historical data, identifying at least one meteorological condition and at least one time period corresponding to higher than threshold air traffic volume in a particular geographic region of the plurality of geographic regions. The method further includes generating a filter criterion based on the particular geographic region, the at least one meteorological condition, and the at least one time period. The method also includes generating a flight plan based on a portion of the historical data that satisfies the filter criterion.

In another particular implementation, a device includes a memory and a processor. The memory is configured to store historical data including timestamped meteorological data and flight path data. The timestamped meteorological data indicates meteorological conditions detected in each of a plurality of geographic regions. The flight path data indicates air traffic volume in each of the plurality of geographic regions during particular time periods. The processor is configured to, based on the historical data, identify at least one meteorological condition and at least one time period corresponding to higher than threshold air traffic volume in a particular geographic region of the plurality of geographic regions. The processor is also configured to generate a filter criterion based on the particular geographic region, the at least one meteorological condition, and the at least one time period. A flight plan is based on a portion of the historical data that satisfies the filter criterion.

In another particular implementation, a computer-readable storage device stores instructions that, when executed by a processor, cause the processor to perform operations including accessing historical data including timestamped meteorological data and flight path data. The timestamped meteorological data indicates meteorological conditions detected in each of a plurality of geographic regions. The flight path data indicates air traffic volume in each of the plurality of geographic regions during particular time periods. The operations also include, based on the historical data, identifying at least one meteorological condition and at least one time period corresponding to higher than threshold air traffic volume in a particular geographic region of the plurality of geographic regions. The operations further include generating a filter criterion based on the particular geographic region, the at least one meteorological condition, and the at least one time period. The operations also include generating a flight plan based on a portion of the historical data that satisfies the filter criterion.

BRIEF DESCRIPTION OF THE DRAWINGS

FIG. 3 is a diagram that illustrates an example of a data portion that satisfies a filter criterion generated by the system of FIG. 1.

DETAILED DESCRIPTION

Figure 1:
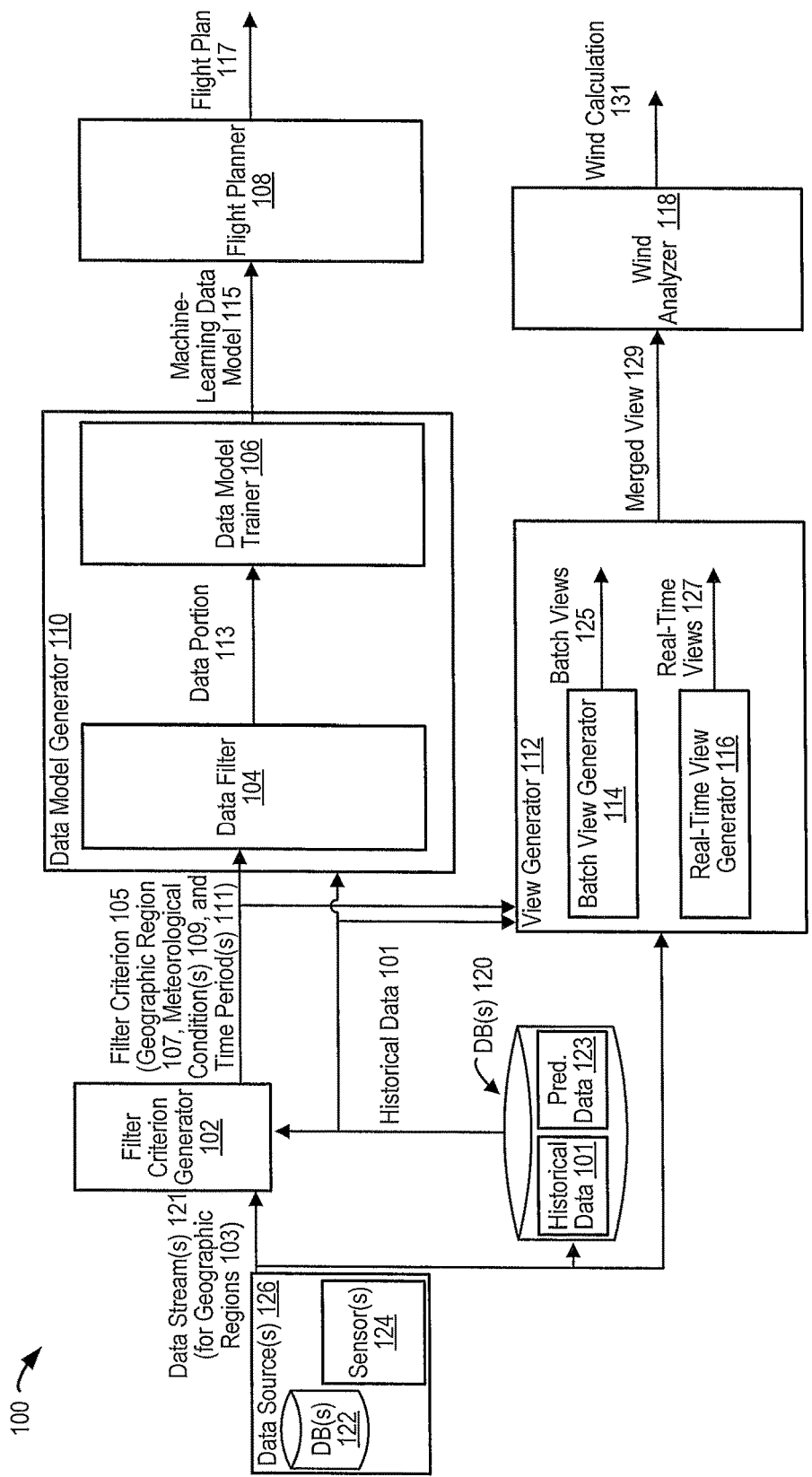
FIG. 1 is a block diagram that illustrates an example of a system that is configured to analyze data based on air traffic volume.

Implementations disclosed herein are directed to simplifying aviation data analysis, for example, by filtering the data based on a filter criterion. The filter criterion may be used to identify a relevant portion of data. For example, data corresponding to a geographic region that has a high air traffic volume is more relevant for aviation analysis than data corresponding to another geographic region with a low air traffic volume. A filter criterion generator determines a filter criterion to identify a portion of data of a geographic region with a high air traffic volume. The filter criterion generator accesses timestamped meteorological data and flight path data. The filter criterion generator identifies a meteorological condition, a time period, or both, during which a particular geographic region has (e.g., historically had or is expected to have) higher than threshold air traffic volume. For example, the filter criterion generator determines, based on the meteorological data and the flight path data, that a particular geographic region has historically had a high traffic volume during a time period (e.g., 2 PM-3 PM) when the wind has a particular direction (e.g., South-East (SE)). The filter criterion generator provides the filter criterion (e.g., data identifying the particular geographic region, the time period, and the particular wind direction) to a data filter. A particular meteorological condition includes at least one of wind direction, precipitation level, local temperature, turbulence, humidity level, or extreme weather.

The data filter identifies a portion of data that satisfies the filter criterion. For example, the portion of the data indicates a meteorological condition (e.g., precipitation level) detected in the particular geographic region during the time period (e.g., 2 PM-3 PM) when the wind has the particular direction (e.g., SE). The portion of the data corresponding to high air traffic volume is more relevant for analysis because a larger number of flights experience the conditions indicated by the portion of the data. The data filter provides the portion of data to various applications for analysis. For example, a data model trainer trains a data model (e.g., a predictive aviation data model) based on the portion of the data. Analyzing the portion of the data (e.g., a subset of the entire set of available data) may be faster compared to analyzing all of the data. Using the portion of the data may enable real-time data analysis for time-critical applications. In a particular example, the filter criterion is used to identify the portion of data for "real-time" or time-critical analysis. The remaining data may be disregarded for analysis or may be used for less time-critical analysis. A first data model that is based on the portion of the data may be smaller than a second data model that is based on all of the data (or more data). Storing the first data model may use less storage space as compared to storing the second data model. Analyzing the portion of the data (as compared to analyzing all the data) focuses resources (e.g., processing cycles, time, and storage space) on more relevant data.

FIG. 1 illustrates an example of a system 100 that includes a filter criterion generator 102 coupled to a data model generator 110 and to a view generator 112. The system 100 includes one or more data source(s) 126. The data source(s) 126 are coupled to at least one of the filter criterion generator 102, one or more databases (DB(s)) 120, or the view generator 112. The data source(s) 126 include one or more databases (DB(s)) 122, one or more sensor(s) 124, or a combination thereof. The sensor(s) 124 include at least one of a temperature sensor, a humidity sensor, a precipitation sensor, a wind direction sensor, a turbulence sensor, or an extreme weather sensor. The data source(s) 126 are configured to generate one or more data stream(s) 121. The data stream(s) 121 indicate at least one of meteorological data or flight path data associated with a plurality of geographic regions 103. For example, a first data stream of the data stream(s) 121 from a first DB of the DB(s) 122 indicates a first flight path of a first aircraft. The first flight path indicates that the first aircraft traveled or is travelling through a first geographic region of the geographic regions 103 during a particular time interval (e.g., 2:00 PM-2:10 PM on a particular day). A particular geographic region may be indicated by at least one of a longitude, a latitude, or an altitude (e.g., a barometric altitude). A second data stream of the data stream(s) 121 from a temperature sensor of the sensor(s) 124 indicates a local temperature detected at the first geographic region at approximately the particular time interval (e.g., 2:00 PM-2:10 PM on the particular day). In a particular aspect, the system 100 operates on multidimensional data. A "dimension" may refer to a semantic object or concept that represents a way of associating data with "dimension members," where the dimension members correspond to continuous or discrete points on an axis.

The DB(s) 120 are configured to store at least one of historical data 101 or predicted data 123 associated with the geographic regions 103. The historical data 101, the predicted data 123, or both, may correspond to data received via the data stream(s) 121 from the data source(s) 126, data received from another device, a user input, a default value, a configuration setting, or a combination thereof. The historical data 101 includes at least one of meteorological data or flight path data. For example, the historical data 101 indicates one or more meteorological conditions detected in the geographic regions 103, one or more flight paths of aircraft that traveled through the geographic regions 103, or a combination thereof. The predicted data 123 includes at least one of predicted meteorological data or predicted flight path data. For example, the predicted data 123 indicates one or more predicted meteorological conditions (e.g., forecasted conditions) in the geographic regions 103, one or more predicted flight paths of aircraft that are expected to travel through the geographic regions 103, or a combination thereof. In a particular implementation, the data model generator 110 and the DB(s) 120 are included in a data cluster (e.g., a big data cluster). The DB(s) 120 may implement a distributed file system that stores large blocks of data across nodes. The data model generator 110 may be configured to concurrently process blocks of data.

The filter criterion generator 102 is configured to generate a filter criterion 105 based on at least one of the data stream(s) 121, the historical data 101, or the predicted data 123. The filter criterion generator 102 is configured to provide the filter criterion 105 to at least one of the data model generator 110 or the view generator 112.

The data model generator 110 includes a data filter 104 coupled to a data model trainer 106. The data filter 104 is configured to identify a data portion 113 that satisfies the filter criterion 105. The data portion 113 corresponds to relevant data to be used for analysis. For example, the data portion 113 corresponds to data associated with a geographic region 107 of the geographic regions 103 that is associated with high air traffic volume. The data model trainer 106 is configured to train a machine-learning data model 115 based on the data portion 113. For example, the data model trainer 106 is configured to train the machine-learning data model 115 using one or more machine-learning techniques. The data model generator 110 is configured to provide the machine-learning data model 115 to at least one of an application or a device.

The system 100 includes a flight planner 108 coupled to the data model trainer 106. In a particular aspect, the data model trainer 106 is configured to provide the machine-learning data model 115 to the flight planner 108. The flight planner 108 is configured to generate a flight plan 117 based on the machine-learning data model 115. For example, the flight planner 108 is configured to generate the flight plan 117 based on an output of the machine-learning data model 115.

It should be understood that the flight planner 108 is provided as an illustrative example. In other implementations, the data model trainer 106 is configured to provide the machine-learning data model 115 to another application. The other application is configured to generate application output based on the machine-learning data model 115. For example, the other application is configured to generate the application output based on an output of the machine-learning data model 115.

The view generator 112 includes a batch view generator 114 and a real-time view generator 116. The batch view generator 114 is configured to determine a batch data portion of batch data (e.g., at least one of the historical data 101, the predicted data 123, or data indicated by the data stream(s) 121) that satisfies the filter criterion 105. The real-time view generator 116 is configured to determine a real-time data portion of real-time data (e.g., data indicated by the data stream(s) 121) that satisfies the filter criterion 105. The view generator 112 may correspond to a data-processing architecture (e.g., a lambda architecture) that includes a batch layer and a speed layer. For example, the batch view generator 114 corresponds to the batch layer and the real-time view generator 116 corresponds to the speed layer. The batch view generator 114 is configured to generate batch views 125 by batch processing the batch data portion. Processing the batch data portion may use fewer resources (e.g., time and memory) as compared to processing all of batch data. The real-time view generator 116 is configured to generate real-time views 127 by performing real-time processing of the real-time data portion. Processing the real-time data portion may use fewer resources (e.g., time and memory) as compared to processing all of the real-time data. The batch views 125 may correspond to more accurate output, whereas the real-time views 127 may correspond to reduced latency. The view generator 112 is configured to generate a merged view 129 by combining the batch views 125 and the real-time views 127. The view generator 112 is configured to provide the merged view 129 to at least one of an application or a device.

In FIG. 1, the system 100 includes a wind analyzer 118 coupled to the view generator 112. In a particular aspect, the view generator 112 is configured to provide the merged view 129 to the wind analyzer 118. The wind analyzer 118 is configured to generate a wind calculation 131 based on the merged view 129. It should be understood that the wind analyzer 118 is provided as an illustrative example. In other implementations, the view generator 112 is configured to provide the merged view 129 to another application. The other application is configured to generate application output based on the merged view 129. In some examples, the other application includes a humidity analyzer, a precipitation analyzer, a temperature analyzer, a turbulence analyzer, a weather analyzer, on air traffic analyzer, or a combination thereof.

It should be noted that various functions performed by the system 100 of FIG. 1 are described herein as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

During operation, the filter criterion generator 102 generates the filter criterion 105, as further described with reference to FIG. 2. In a particular example, a user activates a data analysis application and selects an option to generate a filter criterion. The filter criterion generator 102 generates the filter criterion 105 in response to receiving a user input indicating the user selection. The filter criterion 105 indicates at least one of the geographic region 107, one or more meteorological condition(s) 109, or one or more time period(s) 111, as further described with reference to FIG. 2. For example, the filter criterion generator 102 selects the geographic region 107 from the geographic regions 103 in response to determining that the geographic region 107 has a high air traffic volume during a time period (e.g., 2 PM-3 PM) and that the wind commonly has a particular direction (e.g., SE)) in the geographic region 107 during the time period (e.g., 2 PM-3 PM).

The filter criterion generator 102 provides the filter criterion 105 (e.g., location=the geographic region 107, time period=2 PM-3 PM, and wind direction=SE) to the data model generator 110, the view generator 112, or both. The data filter 104 of the data model generator 110 determines the data portion 113 that satisfies the filter criterion 105, as further described with reference to FIG. 3. For example, the data portion 113 indicates data corresponding to aircraft that traveled (or is expected to travel) through the geographic region 107 during the time period (e.g., 2 PM-3 PM) when the wind had (or is expected to have) the particular direction (e.g., SE). The data portion 113 is associated with high air traffic volume. The data portion 113 may be a subset of the historical data 101, the predicted data 123, the data indicated by the data stream(s) 121, other data, or a combination thereof. The data filter 104 provides the data portion 113 to the data model trainer 106.

In a particular implementation, the data portion 113 has fewer data dimensions than the historical data 101, as further described with reference to FIG. 3. The data filter 104 performs dimension reduction on the data portion 113. For example, the data filter 104 identifies a particular data dimension (e.g., humidity) of the data portion 113. To illustrate, the data filter 104 identifies the particular data dimension (e.g., humidity) in response to determining that each value in the data portion 113 corresponding to the particular data dimension (e.g., humidity) fails to satisfy (e.g., is lower than) a dimension threshold. Values of the particular data dimension that fail to satisfy the dimension threshold may have a low impact on an aviation analysis. The data filter 104 updates the data portion 113 to exclude the particular data dimension.

The data model trainer 106 trains the machine-learning data model 115 based on the data portion 113 corresponding to high air traffic volume. The machine-learning data model 115 may thus be trained to address conditions commonly encountered by a high number of aircraft. In a particular aspect, the data model trainer 106 selects a machine-learning technique from among a plurality of machine-learning techniques (e.g., neural network, decision tree, linear regression, logistic regression, support vector machine, or another machine learning technique) based on the data portion 113. For example, the data model trainer 106 selects a particular machine-learning technique based on a size of the data portion 113, a number of data dimensions included in the data portion 113, or a combination thereof. In a particular aspect, the data model trainer 106 selects a first machine-learning technique in response to determining that the size of the data portion 113 is less than a size threshold, the number of data dimensions of the data portion 113 is less than a dimension threshold, or both. Alternatively, the data model trainer 106 selects a second machine-learning technique in response to determining that the size of the data portion 113 is greater than or equal to the size threshold, that the number of data dimensions of the data portion 113 is greater than or equal to the dimension threshold, or both. The first machine-learning technique may be more computationally complex, more accurate, or both, as compared to the second machine-learning technique. The data model trainer 106 provides the machine-learning data model 115 to the flight planner 108.

In a particular example, the system 100 enables the first machine-learning technique to be performed for a time-critical application where latency associated with generating the machine-learning data model 115 based on the data portion 113 is tolerable and where latency associated with generating the machine-learning data model 115 based on larger data (e.g., with more data dimensions) is not tolerable (e.g., is too high). To illustrate, the historical data 101 may include such large amounts of data (e.g., a large number of data dimensions) that processing the historical data 101 using the first machine-learning technique takes too long for the generated machine-learning data model 115 to be useful for a time-critical application. Using the filter criterion 105 enables the relevant data (e.g., the data portion 113) from the large data (e.g., the historical data 101) to be identified. Processing the relevant data (e.g., the data portion 113) using the first machine-learning technique may take less time such that the generated machine-learning data model 115 is useful for the time-critical application.

In a particular aspect, the data model generator 110 processes large quantities of data (e.g., the historical data 101) in a distributed manner. For example, the filter criterion generator 102 generates multiple filter criteria. To illustrate, the filter criterion generator 102 generates a first filter criterion (e.g., (Location=Geographic Region 107) AND (Time Period(s) 111=2:00 PM-3:00 PM) AND (Meteorological Condition(s) 109=SE Wind Direction)) and a second filter criterion (e.g., (Location=Geographic Region 107) AND (Time Period(s) 111=(August OR November)) AND (Meteorological Condition(s) 109=SE Wind Direction). The filter criterion generator 102 generates the first filter criterion (e.g., the filter criterion 105) substantially concurrently with the second filter criterion. The data filter 104 generates multiple data portions. For example, the data filter 104 determines a first data portion (e.g., the data portion 113) of the historical data 101 that satisfies the first filter criterion (e.g., the filter criterion 105) and determines the second data portion of the historical data 101 that satisfies the second filter criterion. The data filter 104 determines the first data portion substantially concurrently with determining the second data portion.

The data model trainer 106 trains multiple machine-learning data models based on the first data portion and the second data portion. For example, the data model trainer 106 generates a first machine-learning data model (e.g., the machine-learning data model 115) based on the first data portion (e.g., the data portion 113) and a second machine-learning data model based on the second data portion. The data model trainer 106 generates the first machine-learning data model substantially concurrently with the second machine-learning data model. The distributed analysis may reduce latency (e.g., reduce congestion in a network bottleneck) associated with analyzing the historical data 101 to generate the machine-learning data models. The machine-learning data models may be used in various time-critical applications.

The flight planner 108 generates the flight plan 117 based on an output of the machine-learning data model 115. For example, the flight planner 108 determines that an output of the machine-learning data model 115 indicates particular meteorological conditions and determines a particular altitude based on the particular meteorological conditions. The flight planner 108 generates the flight plan 117 to indicate the particular altitude as a recommended cruising altitude. The flight planner 108 may provide the flight plan 117 to at least one of an air traffic controller, a pilot, or an aircraft. Since the recommended cruising altitude is based on conditions experienced by a relatively high number of aircraft, the recommended cruising altitude is likely to be appropriate for the commonly encountered conditions (e.g., meteorological conditions). At least one of the air traffic controller, the pilot, or the aircraft may adjust the recommended cruising altitude in response to detecting less commonly encountered conditions (e.g., extreme weather).

In a particular aspect, the view generator 112 receives the filter criterion 105 from the filter criterion generator 102 and receives the data stream(s) 121 from the data source(s) 126. The batch view generator 114 accesses batch data for processing. The batch data includes at least one of the historical data 101, data indicated by the data stream(s) 121, or the predicted data 123. The batch view generator 114 identifies a batch data portion of the batch data that satisfies the filter criterion 105 (e.g., location=the geographic region 107, time period=2 PM-3 PM, and wind direction=SE). In a particular aspect, the batch data portion has fewer data dimensions than the batch data. For example, the batch view generator 114 performs dimension reduction on the batch data portion. In some aspects, the batch data portion is the same as the data portion 113. In other aspects, the batch data portion is distinct from the data portion 113. In a particular example, the data portion 113 is based on the historical data 101 and is independent of the predicted data 123, whereas the batch data portion is based on the historical data 101 and the predicted data 123. The batch view generator 114 generates the batch views 125 based on the batch portion data. Generating the batch views 125 based on the batch portion data may be faster than generating the batch views 125 based on all of the batch data.

The real-time view generator 116 accesses real-time data for processing. The real-time data includes data indicated by the data stream(s) 121. The real-time view generator 116 identifies a real-time data portion of the real-time data that satisfies the filter criterion 105 (e.g., location=the geographic region 107, time period=2 PM-3 PM, and wind direction=SE). In a particular aspect, the real-time data portion has fewer data dimensions than the real-time data. For example, the real-time view generator 116 performs dimension reduction on the real-time data portion. The real-time view generator 116 generates the real-time views 127 based on the real-time portion data. Generating the real-time views 127 based on the real-time portion data may be faster than generating the real-time views 127 based on all of the real-time data. Generating the real-time views 127 based on the real-time portion data may be faster than generating the batch views 125 based on the batch portion data because the real-time portion data includes less data than the batch portion data. In a particular example, the real-time portion data corresponds to at least one of a single time period, a single geographic region, or a single meteorological condition, whereas the batch portion data corresponds to at least one of multiple time periods, multiple geographic regions, or multiple meteorological conditions. The real-time views 127 correspond to incremental views, whereas the batch views 125 correspond to full views.

The view generator 112 generates the merged view 129 by combining the batch views 125 and the real-time views 127. In a particular aspect, the batch views 125 lag behind the real-time views 127. For example, the batch views 125 correspond to data up to a first time instance t1 and the real-time views 127 correspond to data associated with a second time instance t2 that is subsequent to the first time instance t1. The batch view generator 114 may generate the batch views 125 prior to receiving the data associated with the second time instance t2 and may store the batch views 125 in a memory (e.g., the DB(s) 120). Generating the real-time views 127 corresponding to the second time instance t2 is faster than generating second batch views corresponding to data up to the second time instance t2. The view generator 112 combines the batch views 125 corresponding to data up to the first time instance t1 with the real-time views 127 corresponding to the second time instance t2 to generate the merged view 129 corresponding to data up to the second time instance t2. The view generator 112 provides the merged view 129 to the wind analyzer 118. Providing the merged view 129 to the wind analyzer 118 as compared to providing the second batch views to the wind analyzer 118 reduces latency. The batch view generator 114 generates the second batch views subsequent to providing the merged view 129 to the wind analyzer 118 and replaces the batch views 125 with the second batch views in memory. The merged view 129 may differ from the second batch views. For example, the merged view 129 may include one or more errors. Replacing the batch views 125 with the second batch views may reduce the effects of any differences (e.g., errors) between the merged view 129 and the second batch views.

The wind analyzer 118 generates the wind calculation 131 based on the merged view 129. The wind calculation 131 may be used in a time-critical application. For example, the wind calculation 131 may be used to update the flight plan 117 in real-time for an aircraft that is travelling or is about to travel in accordance with the flight plan 117. Determining the real-time portion data based on the filter criterion 105 reduces the latency associated with updating the flight plan 117. The lower latency enables the flight plan 117 to be more responsive to conditions indicated in the data stream(s) 121.

The system 100 thus enables resources (e.g., time, processing cycles, and data storage) to be focused on data that is more relevant for analysis. For example, analyzing the relevant portion of the data may be faster compared to analyzing all of the data. Using the portion of the data may enable real-time data analysis for time-critical applications. A first data model that is based on the portion of the data may be smaller than a second data model that is based on all of the data. Storing the first data model may use less storage space as compared to storing the second data model.

Figure 2:
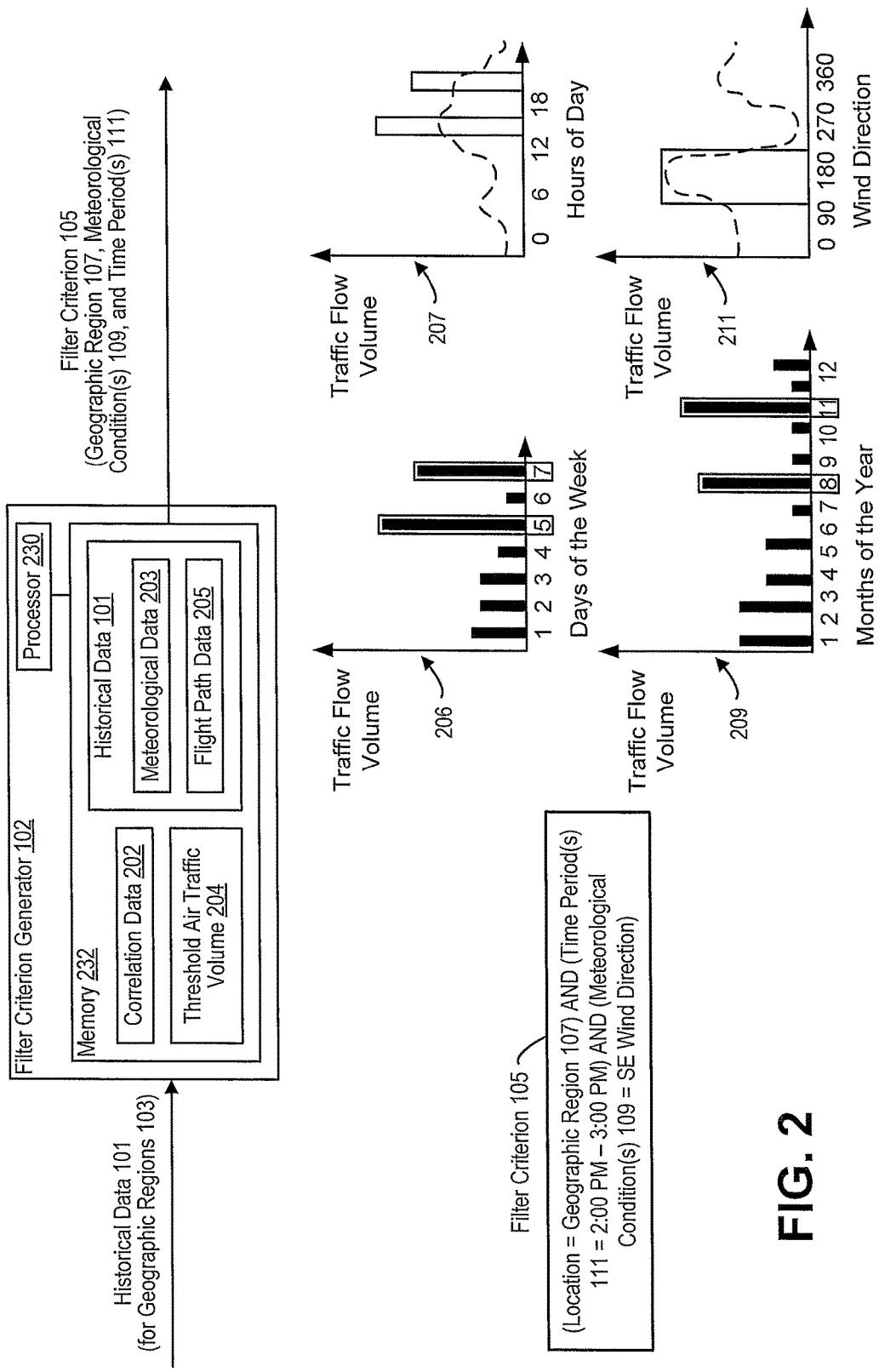
FIG. 2 is a diagram that illustrates an example of a filter criterion generator of the system of FIG. 1.

FIG. 2 illustrates an example of the filter criterion generator 102. The filter criterion generator 102 includes a processor 230 coupled to a memory 232.

During operation, the filter criterion generator 102 accesses the historical data 101. The historical data 101 includes at least one of meteorological data 203, flight path data 205, or both, associated with the geographic regions 103. The flight path data 205 indicates that various aircraft have traveled through the geographic regions 103 during various time periods. For example, the flight path data 205 indicates that a first aircraft has traveled through the geographic region 107 during a first time period and that a second aircraft has traveled through the geographic region 107 during a second time period. The meteorological data 203 includes timestamped meteorological data indicating meteorological conditions detected at various times in various geographic regions. For example, the meteorological data 203 indicates one or more first meteorological conditions detected in the geographic region 107 during the first time period and one or more second meteorological conditions detected in the geographic region 107.

The processor 230 is configured to generate correlation data 202 based on the historical data 101. For example, the processor 230 determines the correlation data 202 indicating correlations between traffic flow volumes in the geographic regions 103 and various factors (e.g., data dimensions). To illustrate, the correlation data 202 indicates traffic flow volumes corresponding to an average number of aircraft that travel through the geographic region 107 during each day of the week. FIG. 2 includes a graph 206 illustrating an example of the traffic flow volumes of the geographic region 107 corresponding to each day of the week.

In a particular example, the correlation data 202 indicates traffic flow volumes corresponding to an average number of aircraft that travel through the geographic region 107 during each hour of the day. FIG. 2 includes a graph 207 illustrating an example of the traffic flow volumes of the geographic region 107 corresponding to each hour of the day. In a particular example, the correlation data 202 indicates traffic flow volumes corresponding to an average number of aircraft that travel through the geographic region 107 during each month of the year. FIG. 2 includes a graph 209 illustrating an example of the traffic flow volumes of the geographic region 107 corresponding to each month of the year. It should be understood that traffic flow volume groupings based on day of the week, hour of the day, or month of the year are described as illustrative examples. The flight path data 205 indicates date/time information (e.g., includes timestamps). The processor 230 is configured to determine traffic flow volumes corresponding to various date or time groupings based on the flight path data 205.

In a particular example, the correlation data 202 indicates traffic flow volumes corresponding to an average number of aircraft that travelled through the geographic region 107 during a time period that a particular meteorological condition was detected in the geographic region 107. FIG. 2 includes a graph 211 illustrating an example of the traffic flow volumes of the geographic region 107 corresponding to wind direction. It should be understood that traffic flow volume grouping based on wind direction is described as an illustrative example. The meteorological data 203 indicates various meteorological conditions detected at various geographic regions. The meteorological data 203 indicates date/time information (e.g., includes timestamps). The processor 230 is configured to determine traffic flow volumes corresponding to various meteorological conditions groupings and various date or time groupings based on the meteorological data 203.

The processor 230 is configured to identify the filter criterion 105 based on a threshold air traffic volume 204. For example, the processor 230 determines that the correlation data 202 indicates that air traffic flow volume of the geographic region 107 is greater than the threshold air traffic volume 204 for a meteorological condition. The graph 211 illustrates an example where air traffic flow volume of the geographic region 107 (e.g., a particular latitude, a particular longitude, and a particular altitude) corresponding to a meteorological condition (e.g., SE wind direction or a wind direction between 90 degrees and 180 degrees) is greater than the threshold air traffic volume 204. In a particular example, an aviation analysis application (e.g., the flight planner 108) determines that the correlation data 202 indicates that a high number of aircraft travel at the particular altitude when the meteorological condition (e.g., SE wind direction) is detected at the particular latitude and the particular longitude and generates the flight plan 117 indicating that an aircraft is to fly at particular altitude if the meteorological condition (e.g., SE wind direction) is detected at the particular longitude and the particular latitude.

In a particular example, the processor 230 determines that the correlation data 202 indicates that a traffic flow volume of the geographic region 107 is greater than the threshold air traffic volume 204 for a time period. The graph 206 illustrates an example where a first traffic flow volume of the geographic region 107 corresponding to a first time period (e.g., Friday) is greater than the threshold air traffic volume 204 and a second traffic flow volume of the geographic region 107 corresponding to a second time period (e.g., Sunday) is greater than the threshold air traffic volume 204. The graph 207 illustrates an example where a first traffic flow volume of the geographic region 107 corresponding to a first time period (e.g., 2 PM-3 PM) is greater than the threshold air traffic volume 204 and a second traffic flow volume of the geographic region 107 corresponding to a second time period (e.g., 8 PM-9 PM) is greater than the threshold air traffic volume 204. The graph 209 illustrates an example where a first traffic flow volume of the geographic region 107 corresponding to a first time period (e.g., August) is greater than the threshold air traffic volume 204 and a second traffic flow volume of the geographic region 107 corresponding to a second time period (e.g., November) is greater than the threshold air traffic volume 204. In a particular example, an aviation analysis application (e.g., the flight planner 108) determines that the correlation data 202 indicates that a high number of aircraft travel at the particular altitude through the particular latitude and the particular longitude during a particular time period (e.g., 2 PM-3 PM). The flight planner 108 may generate the flight plan 117 indicating that an aircraft is to fly at a second altitude if the aircraft is expected to fly through the particular latitude and the particular longitude during the particular time period (e.g., 2 PM-3 PM). In another example, the flight planner 108 generates a recommendation that the aircraft fly through the geographic region 107 during another time period (e.g., 1:00 PM-1:30 PM).

In a particular aspect, the correlation data 202 indicates traffic flow volume for the geographic region 107 corresponding to multiple data dimensions. For example, the correlation data 202 indicates correlation between traffic flow volume for the geographic region 107 during a particular time period (e.g., 2 PM-3 PM) and a meteorological condition (e.g., wind direction).

In a particular aspect, the threshold air traffic volume 204 is based on the geographic region 107, available processing resources, or both. In a particular example, the threshold air traffic volume 204 for the geographic region 107 (e.g., New York City) is distinct from a second threshold air traffic volume for a second geographic region (e.g., Antarctica). In a particular example, the processor 230 sets the threshold air traffic volume 204 to a lower value in response to determining that more processing resources are available. Alternatively, the processor 230 sets the threshold air traffic volume 204 to a higher value in response to determining that fewer processing resources are available.

The processor 230 generates (or updates) the filter criterion 105 associated with the geographic region 107 to indicate the time period(s) 111 in response to determining that the correlation data 202 indicates a first traffic flow volume in the geographic region 107 during the time period(s) 111 (e.g., 2 PM-3 PM) and determining that the first traffic flow volume is greater than the threshold air traffic volume 204. The processor generates (or updates) the filter criterion 105 associated with the geographic region 107 to indicate the meteorological condition(s) 109 in response to determining that the correlation data 202 indicates a second traffic flow volume in the geographic region 107 corresponding to the meteorological condition(s) 109 (e.g., SE wind direction) and determining that the second traffic flow volume is greater than the threshold air traffic volume 204. In a particular aspect, the filter criterion 105 indicates that data associated with the geographic region 107 and corresponding to at least one of the time period(s) 111 or to the meteorological condition(s) 109 satisfies the filter criterion 105 (e.g., Location=Geographic Region 107 AND (Time Period=2:00 PM-3:00 PM OR Wind Direction=SE)). In an alternative aspect, the filter criterion 105 indicates that data associated with the geographic region 107 and corresponding to the time period(s) 111 and to the meteorological condition(s) 109 satisfies the filter criterion 105 (e.g., Location=Geographic Region 107 AND Time Period=2:00 PM-3:00 PM AND Wind Direction=SE).

In a particular aspect, the processor 230 generates the filter criterion 105 associated with the geographic region 107 to indicate the time period(s) 111 and the meteorological condition(s) 109 in response to determining that the correlation data 202 indicates a first traffic flow volume in the geographic region 107 during the time period(s) 111 corresponding to the meteorological condition(s) 109 is greater than the threshold air traffic volume 204. In this aspect, the filter criterion 105 indicates that data associated with the geographic region 107 and corresponding to the time period(s) 111 and to the meteorological condition(s) 109 satisfies the filter criterion 105 (e.g., Location=Geographic Region 107 AND Time Period=2:00 PM-3:00 PM AND Wind Direction=SE). The processor 230 refrains from generating a filter criterion associated with a particular geographic region in response to determining that the correlation data 202 does not indicate any traffic flow volume for the particular geographic region that satisfies the threshold air traffic volume 204.

In a particular aspect, the processor 230 populates a data structure (e.g., a quadtree or an octree) based on the historical data 101 or the correlation data 202. For example, an internal node of the data structure corresponds to a geographic region. The processor 230 identifies one or more nodes corresponding to a higher density of data points. The processor 230 generates filter criteria corresponding to geographic regions associated with the one or more nodes. The processor 230 refrains from generating a filter criterion associated with a particular geographic region corresponding to a node that is associated with a lower density of data points (e.g., no data points).

It should be understood that the historical data 101 is used for ease of explanation. In some aspects, the processor 230 is configured to generate the filter criterion 105 based on at least one of the historical data 101, the prediction data 123, or data indicated by the data stream(s) 121 of FIG. 1.

FIG. 3 illustrates an example of the data portion 113 that satisfies the filter criterion 105. The filter criterion 105 associated with the geographic region 107 indicates the time period(s) 111 (e.g., 2 PM-3 PM) and the meteorological condition(s) 109 (e.g., SE wind direction).

The data filter 104 of FIG. 1 identifies the data portion 113 of data 303 that satisfies the filter criterion 105. The data 303 corresponds to at least one of the historical data 101, the predicted data 123, data indicated by the data stream(s) 121, or other data. The data filter 104 selects a data portion 313 of the data 303 that satisfies the filter criterion 105. The data portion 313 indicates at least one of flight path data or meteorological conditions of the geographic region 107 that satisfy the filter criterion 105. For example, the data filter 104 selects a first subset of the data 303 indicating that, during a first time period (e.g., 2:00 PM-2:10 PM) of the time period(s) 111 (e.g., 2 PM-3 PM), a first number of flights (e.g., 15 flights) traveled through the geographic region 107, the meteorological condition(s) 109 (e.g., SE wind direction) were detected, and one or more additional meteorological conditions (e.g., 80 degrees temperature and 42 percent humidity) were detected. As another example, the data filter 104 selects a second subset of the data 303 indicating that, during a second time period (e.g., 2:30 PM-3:00 PM) of the time period(s) 111 (e.g., 2 PM-3 PM), a second number of flights (e.g., 5 flights) traveled through the geographic region 107, the meteorological condition(s) 109 (e.g., SE wind direction) were detected, and one or more additional meteorological conditions (e.g., 85 degrees temperature and 42 percent humidity) were detected. In a particular aspect, the first number of flights (e.g., 15 flights) is greater than the threshold air traffic volume 204 (e.g., 10). In a particular aspect, the second number of flights (e.g., 5 flights) is less than the threshold air traffic volume 204.

In a particular aspect, the data filter 104 designates the data portion 313 as the data portion 113. Alternatively, the data filter 104 generates the data portion 113 from the data portion 313 to include fewer data dimensions in the data portion 113 as compared to the data portion 313 (and the data 303). For example, the data filter 104, in response to determining that each value corresponding to a particular data dimension (e.g., humidity) in the data portion 313 fails to satisfy a dimension threshold (e.g., 50%), generates the data portion 113 to exclude the particular data dimension (e.g., humidity). The dimension threshold may be a default value, a user input, a configuration setting, an input value received from an application, an input value received from another device, or a combination thereof. Having fewer dimensions reduces the amount of data storage used to store the data portion 113. In a particular aspect, training of the machine-learning data model 115 by the data model trainer 106 is faster based on the data portion 113 with fewer dimensions as compared to the data portion 313. In a particular aspect, the data model trainer 106 selects a particular machine-learning technique based on the number of data dimension of the data portion 113. For example, the data model trainer 106 selects a more computationally complex machine-learning technique in response to determining that the data portion 113 has less than a threshold number of data dimensions.

Figure 4:
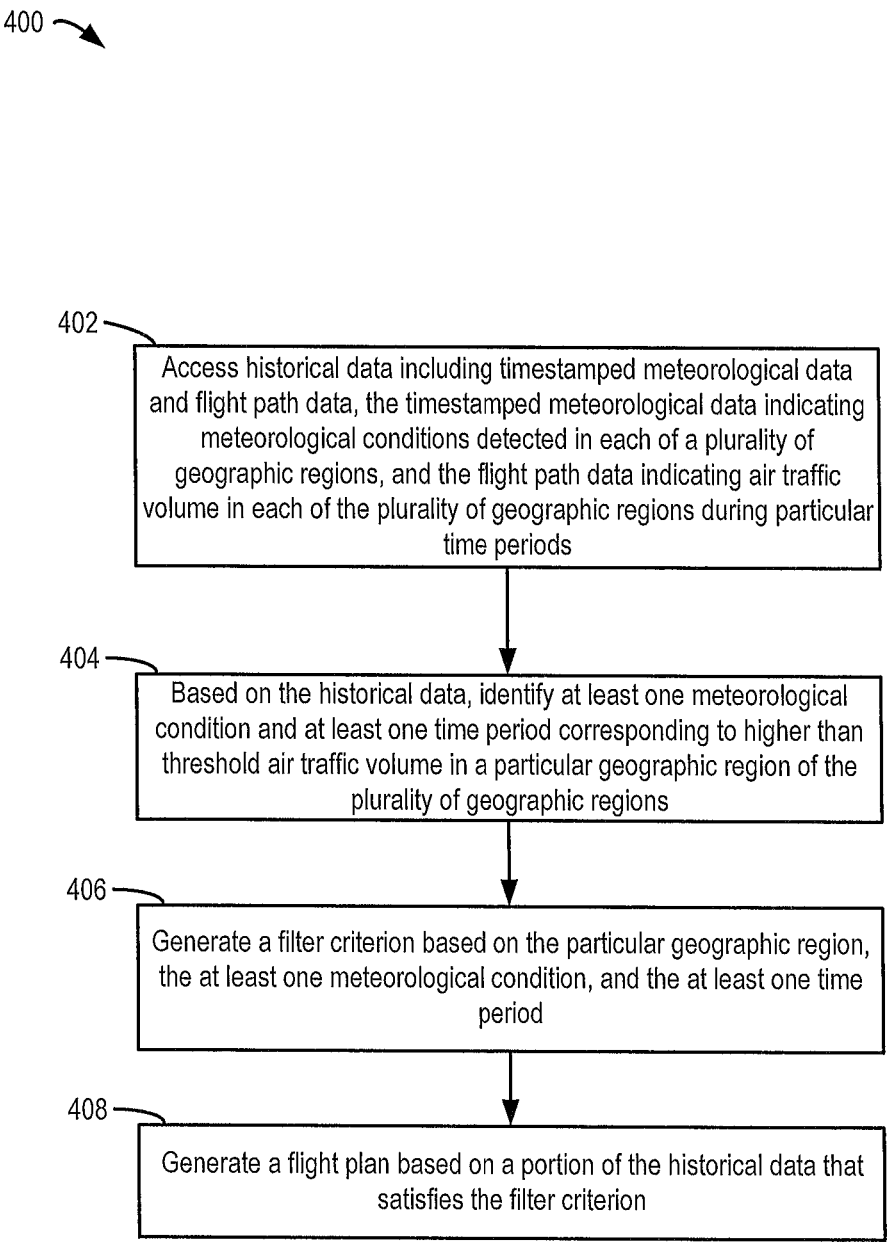
FIG. 4 is a flow chart of an example of a method of analyzing data based on air traffic volume.

FIG. 4 illustrates a method 400 of analyzing data based on air traffic volume. The method 400 is performed by at least one of the filter criterion generator 102, the data filter 104, the data model trainer 106, the data model generator 110, the flight planner 108, or the system 100 of FIG. 1.

The method 400 includes accessing historical data including timestamped meteorological data and flight path data, at 402. For example, as described with reference to FIG. 2, the filter criterion generator 102 accesses the historical data 101 including the meteorological data 203 (e.g., timestamped meteorological data) and the flight path data 205. The meteorological data 203 indicates meteorological conditions detected in each of the geographic regions 103. The flight path data 205 indicates air traffic volume in each of the geographic regions 103 during particular time periods.

The method 400 also includes, based on the historical data, identifying at least one meteorological condition and at least one time period corresponding to higher than threshold air traffic volume in a particular geographic region of the plurality of geographic regions, at 404. For example, as described with reference to FIG. 2, the filter criterion generator 102 identifies, based on the historical data 101, the meteorological condition(s) 109 and the time period(s) 111 corresponding to a higher air traffic volume in the geographic region 107 than the threshold air traffic volume 204.

The method 400 further includes generating a filter criterion based on the particular geographic region, the at least one meteorological condition, and the at least one time period, at 406. For example, as described with reference to FIGS. 1-2, the filter criterion generator 102 generates the filter criterion 105 based on the geographic region 107, the meteorological condition(s) 109, and the time period(s) 111.

The method 400 also includes generating a flight plan based on a portion of the historical data that satisfies the filter criterion, at 408. For example, the flight planner 108 of FIG. 1 generates the flight plan 117 based on the data portion 113 (e.g., a portion of the historical data 101) that satisfies the filter criterion 105.

The method 400 thus enables identifying relevant data (e.g., the data portion 113) that satisfies the filter criterion 105. The flight plan 117 is based on the data portion 113. Generating the flight plan 117 based on the data portion 113 (as compared to the historical data 101) uses fewer resources (e.g., time, processing cycles, and data storage) because the data portion 113 is smaller than the historical data 101. Generating the flight plan 117 based on the data portion 113 focuses limited resources on the relevant data.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
    accessing historical data including first timestamped meteorological data and first flight path data, the first timestamped meteorological data indicating meteorological conditions detected in each of a plurality of geographic regions, and the first flight path data indicating air traffic volume of aircraft that traveled in each of the plurality of geographic regions during one or more time periods;
    based on the historical data, identifying at least one meteorological condition and at least one time period corresponding to higher than a first threshold air traffic volume in a first geographic region of the plurality of geographic regions;
    generating a filter criterion based on the first geographic region, the at least one meteorological condition, and the at least one time period; and
    generating a flight plan based on a portion of the historical data that satisfies the filter criterion.

2. The method of claim 1, further comprising training a machine-learning data model based on the portion of the historical data, wherein the flight plan is based on an output of the machine-learning data model.

3. The method of claim 1, wherein the meteorological conditions include at least one of wind direction, precipitation level, local temperature, turbulence, or humidity level.

4. The method of claim 1, further comprising determining the first threshold air traffic volume based on at least one of the first geographic region or available processing resources, wherein the available processing resources include at least one of available processing cycles, available time, or available storage space.

5. The method of claim 1, further comprising selecting, based on the portion of the historical data, a first machine-learning technique from among a plurality of machine-learning techniques, the plurality of machine-learning techniques including at least two of a neural network technique, a decision tree technique, a linear regression technique, a logistic regression technique, or a support vector machine technique.

6. The method of claim 1, wherein the portion of the historical data includes fewer data dimensions than the historical data.

7. The method of claim 1, further comprising:
receiving a real-time data stream;
generating one or more views of the real-time data stream based on the filter criterion; and
updating a wind calculation based on the one or more views.

8. The method of claim 1, further comprising receiving a real-time data stream indicating at least one of second timestamped meteorological data or second flight path data, wherein the at least one meteorological condition and the at least one time period are identified based on the real-time data stream.

9. The method of claim 8, wherein the flight plan is based on a portion of the real-time data stream that satisfies the filter criterion.

10. A device comprising:
a memory configured to store historical data including first timestamped meteorological data and first flight path data, the first timestamped meteorological data indicating meteorological conditions detected in each of a plurality of geographic regions, and the first flight path data indicating air traffic volume of aircraft that traveled in each of the plurality of geographic regions during one or more time periods; and
a processor configured to:
based on the historical data, identify at least one meteorological condition and at least one time period corresponding to higher than a first threshold air traffic volume in a particular first geographic region of the plurality of geographic regions; and
generate a filter criterion based on the first geographic region, the at least one meteorological condition, and the at least one time period, wherein a flight plan is based on a portion of the historical data that satisfies the filter criterion.

11. The device of claim 10, wherein the first threshold air traffic volume corresponding to the first geographic region is distinct from a second threshold air traffic volume corresponding to a second geographic region.

12. The device of claim 10, wherein the processor is further configured to train a machine-learning data model based on the portion of the historical data, and wherein the flight plan is based on an output of the machine-learning data model.

13. The device of claim 10, wherein the processor is further configured to, in response to determining that the portion of the historical data includes fewer than a threshold number of dimensions, select a first machine-learning technique is from among a plurality of machine-learning techniques to train a machine-learning data model, and wherein the plurality of machine-learning techniques includes at least two of a neural network technique, a decision tree technique, a linear regression technique, a logistic regression technique, or a support vector machine technique.

14. The device of claim 10, further comprising a receiver configured to receive a real-time data stream indicating at least one of second timestamped meteorological data or second flight path data, wherein the at least one meteorological condition and the at least one time period are identified based on the real-time data stream.

15. A computer-readable storage device storing instructions that, when executed by a processor, cause the processor to perform operations comprising:
accessing historical data including first timestamped meteorological data and first flight path data, the first timestamped meteorological data indicating meteorological conditions detected in each of a plurality of geographic regions, and the first flight path data indicating air traffic volume of aircraft that traveled in each of the plurality of geographic regions during one or more time periods;
based on the historical data, identifying at least one meteorological condition and at least one time period corresponding to higher than a first threshold air traffic volume in a first geographic region of the plurality of geographic regions;
generating a filter criterion based on the first geographic region, the at least one meteorological condition, and the at least one time period; and
generating a flight plan based on a portion of the historical data that satisfies the filter criterion.

16. The computer-readable storage device of claim 15, wherein the operations further comprise:
selecting, based on the portion of the historical data, a first machine-learning technique from among a plurality of machine-learning techniques, wherein the plurality of machine-learning techniques includes at least two of a neural network technique, a decision tree technique, a linear regression technique, a logistic regression technique, or a support vector machine technique; and
using the machine-learning technique to train a machine-learning data model based on the portion of the historical data,
wherein the flight plan is based on an output of the machine-learning data model.

17. The computer-readable storage device of claim 15, further comprising:
identifying a first portion of the historical data that satisfies the filter criterion;
selecting a data dimension of the historical data based on one or more values corresponding to the data dimension in the first portion of the historical data; and
generating the portion of the historical data to exclude the data dimension.

18. The computer-readable storage device of claim 17, wherein the data dimension is selected in response to determining that the one or more values fail to satisfy a threshold.

19. The computer-readable storage device of claim 15, wherein the operations further comprise accessing predicted data including predicted meteorological data, predicted flight path data, or both, wherein the at least one meteorological condition and the at least one time period are identified based on the predicted data.

20. The computer-readable storage device of claim 19, wherein the flight plan is based on a portion of the predicted data that satisfies the filter criterion.

* * * * *